US006982725B2

(12) United States Patent
Stamm et al.

(10) Patent No.: US 6,982,725 B2
(45) Date of Patent: *Jan. 3, 2006

(54) DROPOUT CONTROL IN SUBPIXEL RENDERING

(75) Inventors: Beat Stamm, Redmond, WA (US); Michael Duggan, Kirkland, WA (US); Gregory Hitchcock, Woodinville, WA (US); Paul Linnerud, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/086,629

(22) Filed: Mar. 21, 2005

(65) Prior Publication Data

US 2005/0162443 A1    Jul. 28, 2005

Related U.S. Application Data

(63) Continuation of application No. 10/164,533, filed on Jun. 6, 2002, now Pat. No. 6,894,702.

(51) Int. Cl.
*G06K 9/40* (2006.01)
*G09G 5/00* (2006.01)
*G06T 17/00* (2006.01)

(52) U.S. Cl. ............... 345/613; 345/421; 345/611; 382/254; 382/266; 382/269

(58) Field of Classification Search ................ 345/418–428, 600–618, 581, 586; 382/254–276
See application file for complete search history.

(56) References Cited

U.S. PATENT DOCUMENTS

| | | | | |
|---|---|---|---|---|
| 6,188,385 B1 * | 2/2001 | Hill et al. | ............ | 345/614 |
| 6,219,025 B1 * | 4/2001 | Hill et al. | ............ | 345/589 |
| 6,282,327 B1 * | 8/2001 | Betrisey et al. | ........ | 382/299 |
| 6,339,426 B1 * | 1/2002 | Lui et al. | ............ | 345/467 |
| 6,525,770 B1 * | 2/2003 | Ueda et al. | ........... | 348/316 |
| 6,894,702 B2 * | 5/2005 | Stamm et al. | ......... | 345/613 |
| 2002/0015041 A1 * | 2/2002 | Naegle et al. | ......... | 345/501 |

* cited by examiner

*Primary Examiner*—Matthew C. Bella
*Assistant Examiner*—Wesner Sajous
(74) *Attorney, Agent, or Firm*—Workman Nydegger

(57) ABSTRACT

The present invention relates to dropout control in which one or more samples are added to adjacent samples that fall within an image outline. The samples are used in sub-pixel rendering to compensate for unnaturally thin or faint object stems. Horizontal dropout control operations are provided to add samples to sets of horizontally adjacent samples such that each set of samples comprises a minimum number of samples. Vertical dropout control operations are provided to position samples such that the weighted anti-aliasing filtering will take sufficient account of the samples. In one embodiment, an associative table is utilized to calculate alternative patterns of samples. In another embodiment, the baseline of an object is used in the dropout control operations to reduce artifacts that can be created by the addition of samples in the vertical direction.

18 Claims, 11 Drawing Sheets

DROPOUT CONTROL IN SUBPIXEL RENDERING

CROSS-REFERENCE TO RELATED APPLICATIONS

The present application is a continuation application of commonly-assigned U.S. patent application Ser. No. 10/164,533 filed Jun. 6, 2002, now U.S. Pat. No. 6,894,702 of the same title and which is incorporated herein by reference.

BACKGROUND OF THE INVENTION

1. The Field of the Invention

The present invention relates to dropout control when rendering an image adapted to compensate for thin stems of an image. In particular the present invention relates to systems and methods of dropout control utilized in sub-pixel rendering to compensate for thin or faint stems of an image in which one or more samples are added to an image, the samples corresponding with one or more consecutively spaced samples.

2. Background and Relevant Art

During the rendering of an image related to a character of a particular font, a rasterizer program utilizes "hints" associated with the particular character. The "hints" are created by a typographic engineer or, for less demanding applications, a specialized computer program. Hints are prepared identifying characteristics of the original font design and using instructions that adjust the outline to preserve those characteristics when the object outline is rendered in different sizes on different display devices. The "hints" are created by the typographic engineer by analyzing the outlines of the fonts and adding hints as appropriate. Hinting which is the creation and use of hints in the rendering of a character of an image, is an important part of rendering images. Common hinting goals include maintaining consistent stem weights, consistent alignment, even spacing, and the elimination of pixel discontinuities.

The use of sub-pixel positioning on pixel-oriented display devices has made it possible to display text of smaller-sizes while still maintaining readability. Additionally, narrow or curvilinear portions of larger objects can be rendered more accurately. Anti-aliasing techniques have been adapted to improve the smooth appearance of smaller objects and narrow and curvilinear portions of objects. Examples of such techniques are described in U.S. Pat. No. 6,219,025, which is incorporated herein by reference. While sub-pixel rendering is used to improve the readability of rendered objects, conventional hinting is typically adapted for use with full pixel rendering. As a result sub-pixel rendering can result in sampling error distortions. The cause of sampling error distortions is not limited to sub-pixel rendering but can also be experienced as a result of other causes, for example where small image features are displayed on a display device having a low resolution.

One type of common sampling error is called "dropout." Traditionally, a dropout condition is defined as an interior region of an object outline that passes through a scan line and between adjacent pixels in which neither pixel has been shaded to represent the portion of the object outline. As used herein, the terms "shaded" and "activated" refer to the luminous intensity of a pixel or a pixel sub-component being controlled to represent the foreground color of a character or another image feature or to distinguish from the background color. Assuming a black foreground color, shading or activating involves applying a luminous intensity other that the full intensity.

Dropout conditions are typically the result of sampling routines of conventional full pixel rendering. In conventional sampling routines, a single sample is taken corresponding with the center of the pixel to determine whether or not the pixel should be shaded. Where the sample at the pixel center falls within the outline of the object or image, the pixel is used to represent a portion of the object. A dropout condition occurs when the interior of the object outlines become so narrow that the contour of the object outline misses one or more pixel centers. If a dropout control technique is not used to correct the dropout condition, the decision-making algorithm for activating a pixel may determine that a particular pixel should not be activated, thereby causing a break at a point in a character or other object that the viewer would expect to be continuous.

With reference now to FIG. 1, there is shown an image rendered with full pixel precision resulting in a dropout condition and the use of conventional dropout control to correct the dropout condition. In FIG. 1A there is shown a bitmap 10 having a plurality of pixels, each pixel having a sample corresponding to the pixel and being positioned at the center of the pixel. An image outline 12 is superimposed on bitmap 10. Image outline 12 corresponds with an image to be rendered. A rendered image displayed without dropout control 16a is also shown. The rendered image displayed without dropout control 16a is comprised of a plurality of pixels in which the samples at the pixel centers fall within the image outline 12. For example, pixel 14 represents a portion of the image outline 12. Pixel 14 is shaded due to the fact that the sample at the center of pixel 14 lies within image outline 12. There is also shown pixel 20. While pixel 20 corresponds with a portion of image outline 12, the sample at the center of pixel 20 does not lie within image outline 12. As a result, pixel 20 is not shaded. Because none of the pixels horizontally adjacent to pixel 20 are shaded, the shading of pixels representing the portion of outline 12 corresponding to pixel 20 is discontinuous. However, the portion of image outline 12 corresponding to pixel 20 is continuous. This results in a dropout condition due to the fact that the interior region of the object outline that passes through the image outline 12 and between adjacent pixels neither of which has been shaded to represent the object outline.

The subjective response of the typical viewer to a dropout condition is to prefer having a pixel illuminated or otherwise controlled to correct discontinuity in the strokes of the object, even if it tends to geometrically distort the object. Therefore, the art has addressed the subject of dropout control so that discontinuous portions of the displayed image are eliminated by identifying any discontinuous portions of the displayed image corresponding to continuous portions of the image outline, and shading adjacent pixels to eliminate the discontinuity.

FIG. 1B illustrates an image 16b rendered using dropout control. Image 16b rendered using dropout control is comprised of a plurality of shaded pixels positioned adjacent one to another without discontinuity. As in FIG. 1A, pixel 14 is shaded due to the fact that the sample at the pixel center lies within image outline 12. However, unlike FIG. 1A, pixel 20 is shaded notwithstanding the fact that the sample at the center of pixel 20 does not lie within the image outline 12. Pixel 20 is shaded utilizing dropout control. As previously explained, conventional dropout control operates by identifying continuous portions of image outline 12 wherein the pixels to be shaded corresponding with image outline 12 are not continuous. Once the discontinuity in the pixels to be shaded is identified, the dropout control operations convert an unshaded pixel that most closely corresponds with the image outline 12 to a shaded pixel (i.e. pixel 20.)

A variety of techniques can be utilized in conventional dropout control operations. One technique for addressing the dropout problem is to activate the pixel on the left of the image outline when both sides of the image outline pass between a horizontal pair of pixels. For a vertical pair of pixels, dropout control according to this technique activates the pixel below the image outline. Another technique of dropout control illuminates the pixel located nearest the contour of the object outline. Dropout control generally provides a rendered image having an appearance preferred by viewers because it preserves the continuity of the object outline.

Sub-pixel rendering introduces a form of dropouts that is not necessarily the result of discontinuous shading of pixels corresponding to the image outline. Distortions in an image outline caused by discontinuous shading, of adjacent pixel sub-components is less of a problem in sub-pixel rendering than in full pixel rendering due to the increased resolution offered by pixel sub-components and the increased number of samples per pixel utilized in the supersampling routines. However, sub-pixel rendering routines often use hinting adapted to be utilized with full pixel rendering. This can result in object stems that are unnaturally thin and/or lightly shaded, particularly where anti-aliasing techniques are applied to the image. While the pixel sub-components depicting the image are typically continuous, portions of the object can appear to be discontinuous and/or faint due to the thin object stems and the light shading of the pixel sub-components representing the object stems. This is particularly true of the diagonal and curvilinear portions of the images. While the absence of a sample does not necessarily lead to a discontinuity in sub-pixel rendering, the effect thereof is similar such that it may be perceived as a discontinuity dropout condition. Such perceived discontinuity drop-out conditions resulting from the unnaturally thin and/or faint shading of the object stems also comprise drop-out conditions though they are of a somewhat different nature than that of conventional discontinuity dropout conditions. Such dropout conditions are sometimes referred to as "virtual" dropout as there is no actual discontinuity in the samples corresponding with a continuous object outline.

With reference now to FIG. 2, there is illustrated a dropout condition that is the result of sub-pixel rendering. Pixel grid 30 includes a plurality of pixels arranged in a plurality of rows R1–R5 and a plurality of columns C1–C6. Each pixel comprises three pixel sub-components. In one typical configuration, each pixel comprises a red pixel sub-component, a green pixel sub-component, and a blue pixel sub-component. As will be appreciated by those skilled in the art, a variety of types and configurations of pixels and pixel sub-components can be utilized.

There is shown a portion of an image 32 on pixel grid 30, which is rendered using sub-pixel positioning. It can be seen that the pixel sub-components representing portion of image 32 are assigned a variety of luminous intensity values. In the illustrated embodiment, the foreground color is achieved by having a lesser luminous intensity than the background color. Horizontally adjacent pixel sub-components 34, 36, and 38 are shaded to represent a portion of the image 32. The luminous intensity of each pixel sub-component can be determined using a variety of rendering techniques, including spatially displaced sampling and anti-aliasing (i.e., gray scaling). For a more complete discussion of these techniques, refer to U.S. patent application Ser. No. 10/146,424, entitled "Type Size Dependent Anti-Aliasing in Sub-Pixel Precision Rendering Systems", filed May 14, 2002, which is incorporated herein by reference.

Anti-aliasing techniques are adapted to smooth the edges of the image to reduce the jagged appearance of the image by reducing the contrast in luminous intensity values between foreground and background pixels at the object edges. For example, pixel sub-component 38 has the lightest shading in comparison to the background color due to the fact that pixel sub-component 38 is positioned at the edge of the image. Pixel sub-component 34 has the greatest amount of shading because pixel sub-component 34 represents an interior portion of the image, the portion of the image having a more substantial stem width. Pixel sub-component 36 has an intermediate shading due to its position between the pixels 34 and 38.

There is also shown a pixel 40 corresponding with a portion of the image 32. Pixel 40 comprises a first pixel sub-component 42, a second pixel sub-component 44, and a third pixel sub-component 46. The portion of the image corresponding with pixel 40 has a narrow stem width. As a result, only pixel sub-components 44 and 46 are shaded while pixel sub-component 42 remains unshaded. Pixel sub-components 44 and 46 have a light shading due to the anti-aliasing techniques utilized in the rendering of the image. The light shading of pixel sub-components 44 and 46 makes the already narrow stem width more difficult to perceive. This creates a dropout condition in the portion of the image corresponding to pixel 40.

BRIEF SUMMARY OF THE INVENTION

The present invention extends to both methods and systems for dropout control to compensate for thin stems of an image in which one or more samples corresponding to pixel sub-components are added to one or more consecutively spaced samples. The samples added to the one or more consecutively spaced samples are used in sub-pixel rendering to compensate for overly thin and/or faint object stems of an image. An image can comprise a text character or any other type of graphics object that can benefit from dropout control.

According to one aspect of the present invention, horizontal dropout control operations are provided in which a set of samples is identified for a row of samples. The dropout control operations determine whether the set of samples comprises the minimum number of samples. If not, samples are selectively added such that the set of samples comprises the minimum number of samples. An associative table can also be utilized to replace sets of samples with alternative patterns of samples to facilitate the dropout control operations.

According to another aspect of the present invention, vertical dropout control operations are provided in which a set of samples is identified for a column of samples. The vertical dropout control operations calculate whether the set of samples comprises the minimum number of samples. It is determined whether the samples of the set of samples are positioned with respect to one or more pixel sub-components such that the weighted anti-aliasing filtering will take sufficient account of the samples. Samples are selectively added such that the set of samples comprises the minimum number of samples positioned, with respect to the one or more pixel sub-components, such that weighted anti-aliasing applied in the vertical direction will take sufficient account of the samples. An associative table can also be utilized to replace sets of samples for a column of samples with alternative patterns of samples to facilitate the vertical dropout control operations. In another embodiment, sets of samples are obtained by processing sections of the bitmap. The sections of the bitmap are processed by obtaining the section of the bitmap, rotating the section such that the vertical direction becomes the horizontal direction, processing the section in a bit-wise fashion to identify sets of samples, selectively adding samples to the sets of samples, and rotating the section of the bitmap to return the section to its original orientation. In yet another embodiment, a baseline of the object is used to add samples to reduce artifacts that can be created by the addition of samples in the vertical direction.

According to yet another aspect of the invention, horizontal and vertical dropout control operations are utilized during the rendering of the object. The use of horizontal and vertical dropout control routines are utilized due to the fact that different anti-aliasing techniques can be applied to objects in the horizontal and vertical directions. Different anti-aliasing techniques are utilized in the horizontal and vertical directions due to the configurations of pixel sub-components used in sub-pixel rendering. Assuming that the vertical direction is the direction parallel to the pixel sub-component striping, sub-pixel rendering results in increased resolution in the horizontal but not the vertical direction. Accordingly, horizontally adjacent samples provide a linear contribution to a rendered image, while vertically adjacent samples provide a weighted contribution to a rendered image. The use of horizontal and vertical dropout control operations adapted to the particular requirements of vertical and horizontal anti-aliasing routines and pixel sub-component characteristics results in an improved rendered image.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for dropout control to compensate for thin stems of an image in which one or more samples corresponding to pixel sub-components are added to one or more consecutively spaced samples. The samples added to the one or more consecutively spaced samples are used in sub-pixel rendering to compensate for overly thin and/or faint object stems of an image. An image can comprise a text character or any other type of graphics object that can benefit from dropout control.

1. Dropout in Subpixel Rendering

Figure 1B:
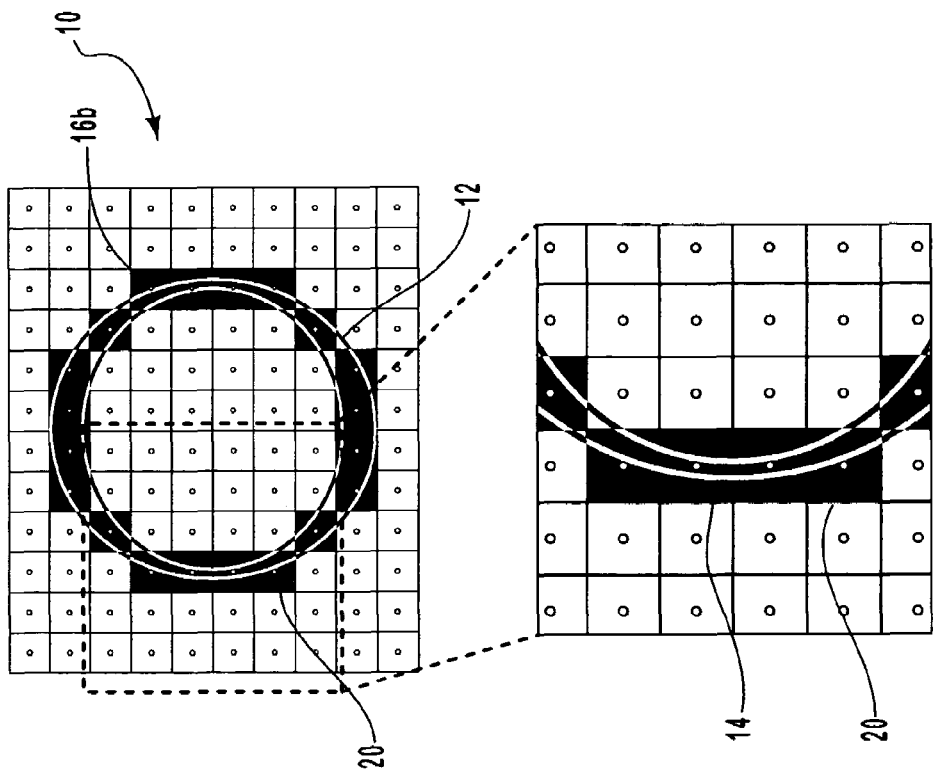
FIGS. 1A and 1B illustrate the manner in which conventional dropout control is used to compensate for discontinuous pixel shading for continuous portions of an image outline.
Figure 1A:
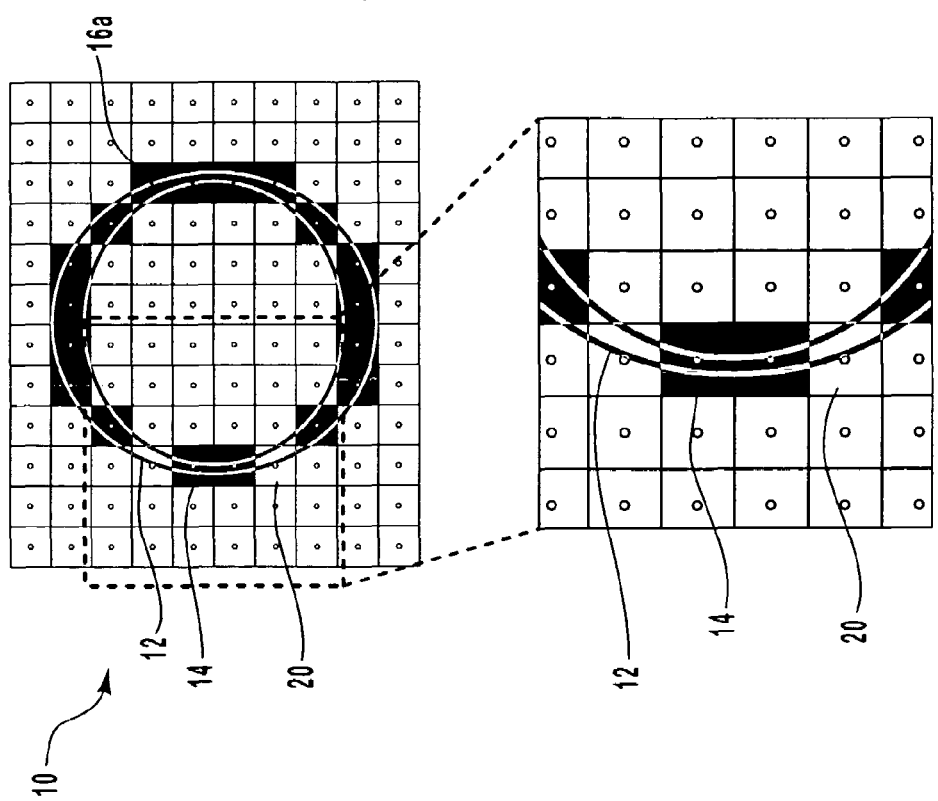
Figure 2:
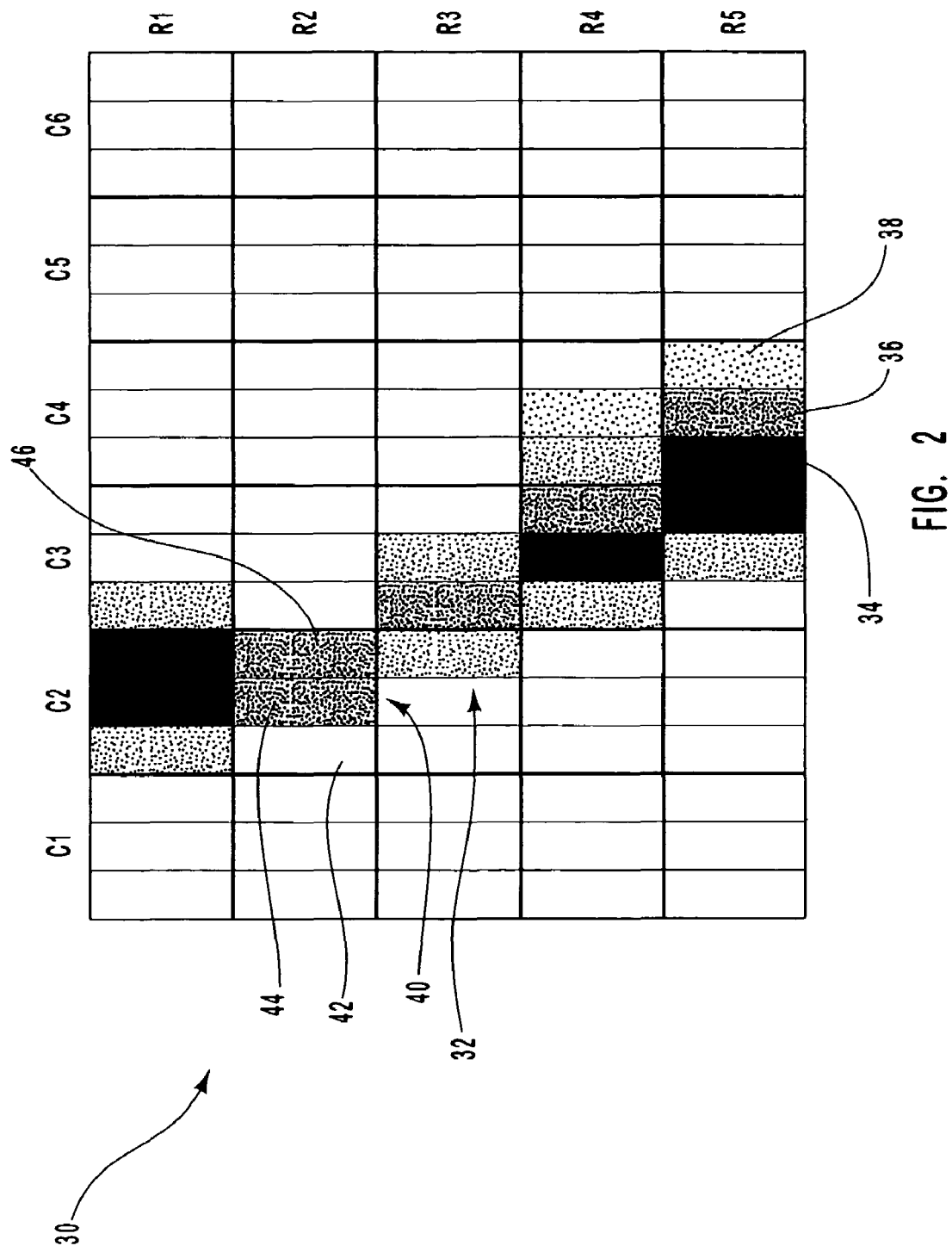
FIG. 2 illustrates the manner in which pixel sub-component precision rendering can result in dropout conditions created by unnaturally thin and/or lightly shaded stems.
Figure 3C:
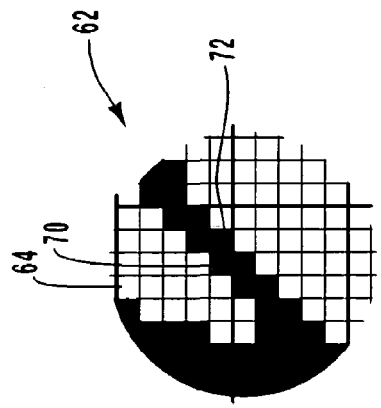
FIGS. 3A through 3D illustrate the manner in which sampling routines utilized in subpixel rendering can lead to unnaturally thin stems.
Figure 3D:
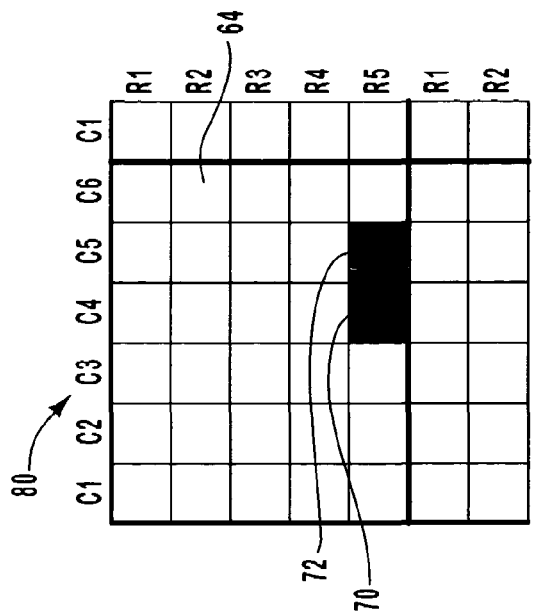
Figure 3A:
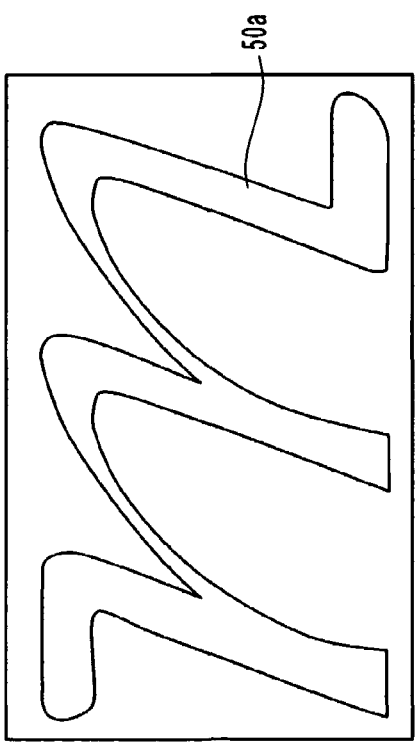

FIGS. 3A through 3D illustrate how sampling routines utilized in sub-pixel rendering can lead to unnaturally thin stems and the method in which dropout control operations are utilized to detect dropout conditions according to one embodiment of the present invention. FIG. 3A illustrates an image 50a that is to be displayed on a display device. In this example, image 50a comprises the character "m". The rendering routines that are utilized to depict image 50a on a display device include: 1) interpretation of a set of rendering instructions by a rasterizer to fit the outlines of image 50a to a grid; 2) scan-converting the grid-fitted outlines; 3) filling the samples corresponding to the scan-converted outlines into a bitmap; 4) anti-aliasing rectangular sections of the bitmap; 5) correcting RGB values for sigmoidal or exponential non-linearities; and 6) displaying the corrected RGB values utilizing a text application program interface (API).

Figure 3B:
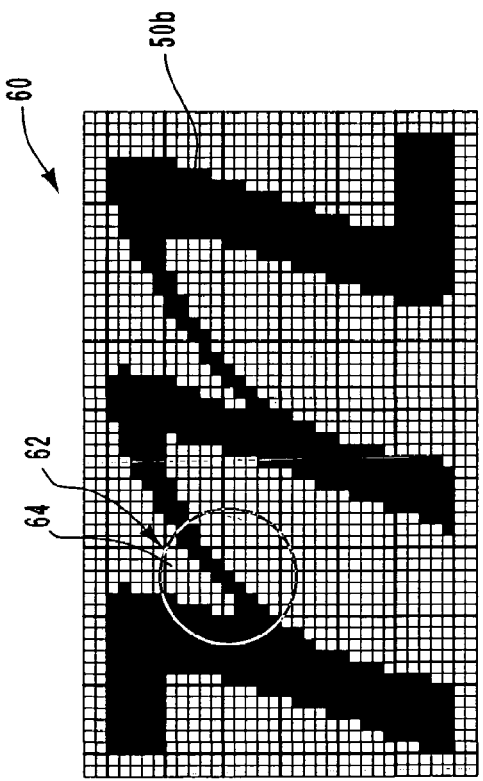

FIG. 3B illustrates the image after the rasterizer has filled the samples corresponding to the scan-converted outline into a bitmap according to the rendering routines utilized. In the illustrated embodiment, the bitmap comprises a supersample grid 60. In contrast to full pixel rendering, in which a single sample is positioned at the pixel center, supersampling is utilized with sub-pixel rendering in which a plurality of samples are utilized for each pixel, due to the fact that each pixel sub-component is treated as a separate luminous intensity source in sub-pixel rendering. The filling of the samples corresponding to the scan converted outline of image 50*a* results in a supersample version of the image 50*b* in which five rows and six columns of samples correspond to the region associated with each full pixel. As can be seen in FIG. 3B, supersample version of the image 50*b* is comprised of samples of the supersample grid 60. The plurality of samples of image 50*b* are utilized in spatially displaced sampling routines of sub-pixel rendering to increase the resolution of the image while smoothing the edges of the image being rendered. While supersampling is used in the rendering routines of the illustrated embodiment, it will be appreciated by those skilled in the art that the present invention can utilize other routines and methods of sampling within the scope and spirit of the present invention. For example, routines utilizing overscaling can be utilized to render an image to obtain multiple samples per full pixel. A portion of the supersample grid 62 corresponding with a dropout region of image 50*b* is shown. There is shown a pixel 64 corresponding with the dropout region of image 50*b*, in which pixel 64 includes a plurality of samples representing image 50*b*.

FIG. 3C shows the portion of supersample grid 62 in greater detail. It can be seen that a grid of samples corresponds with pixel 64. The grid of samples corresponding with pixel 64 is arranged with a configuration of five rows and six columns. While the grid of samples is arranged with a configuration of five rows and six columns, any of a number of other configurations of samples can comprise the grid of samples of each pixel. In order to describe the dropout control techniques according to this embodiment of the invention, reference is made to samples 70 and 72 at row R5 and columns C4 and C5, respectively. Samples 70 and 72 represent a portion of image 50*b*. Additional samples representing a portion of image 50*b* are also positioned in the grid of samples corresponding with pixel 64.

With reference now to FIG. 3D, there is shown the method in which the dropout control operations of this embodiment of the present invention detect a potential dropout condition. Supersample grid 80 of FIG. 3D includes the grid of samples corresponding with pixel 64. The grid of samples corresponding with pixel 64 comprises columns of samples C1–C6 and rows of samples R1–R5. The dropout control operations in accordance with the present invention process the bitmap in a bit-wise fashion. Each position on the supersample grid is analyzed to identify the presence of a sample. Once a sample is identified, the dropout control operations identify each of the consecutively placed samples. It is then determined whether the set of consecutively placed samples comprise a minimum number of samples. In the preferred embodiment, the bitmap is processed section by section. A section can comprise a machine word comprising, for example, 32 bytes. Alternatively, the section can include an alternative number of bits that can be processed efficiently. In other words, discrete sections of the bitmap are processed in a bit-wise fashion to facilitate efficient processing of the entire bitmap. As will be appreciated by those skilled in the art, the bitmap can be processed row by row, column by column, or in any other configuration in which samples can be identified.

In the illustrated embodiment, processing of the bitmap is conducted row by row. A set of samples that includes samples 70 and 72 is detected for the row of samples R5 of pixel 64. Each set of samples comprises a group of one or more adjacent samples. The sets of samples can include mutually exclusive groups of consecutive samples. The set of samples can also include all of a group of adjacent samples for the row of samples. Once the adjacent samples are identified, it is determined whether the set of samples comprises a minimum number of samples that correspond to positions within the outline of the image (e.g., samples 70 and 72). In the event the set of samples does not comprise the minimum number of samples, a dropout condition is identified. In the preferred embodiment, the minimum number of samples comprises the number of samples needed to compensate for thin object stems and/or to ensure that the anti-aliasing routines utilized when rendering the object will not result in unnaturally faint object stems. The minimum number of samples can be a variable number of samples determined by the processor or alternatively can be predetermined number of samples. In one embodiment, the minimum number of samples is based on the resolution of the display screen. In an alternative embodiment, the minimum number of samples is determined based on the font size of the image being rendered. In yet another alternative embodiment, the minimum number of samples is determined utilizing the hinting of the image being rendered.

2. Horizontal Dropout Control

FIG. 4 illustrates the manner in which samples can be added to existing samples in the direction perpendicular to the pixel sub-component striping to compensate for thin object stems according to one embodiment of the present invention. For the sake of clarity and for the purposes of illustration, the present invention will be explained by describing the direction perpendicular to the pixel sub-component striping as the horizontal direction. As will be appreciated by those skilled in the art, the direction perpendicular to the pixel sub-component striping is not the horizontal direction in some display devices. Accordingly, any reference to the horizontal direction herein does not limit the dropout control routines used in the direction perpendicular to the pixel sub-component striping to the horizontal direction.

Figure 4B:
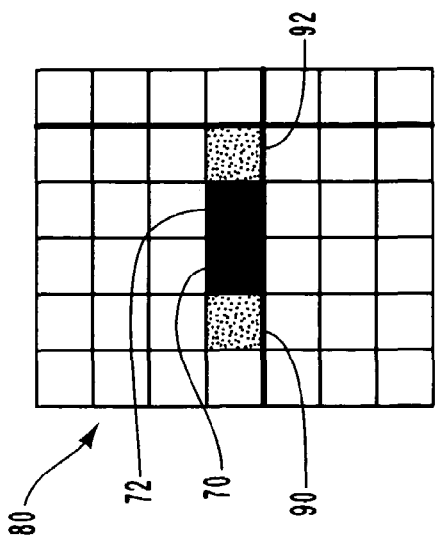
FIGS. 4A through 4D illustrates the manner in which samples can be added to existing samples in the horizontal direction to compensate for thin object stems according to one embodiment of the present invention.
Figure 4C:
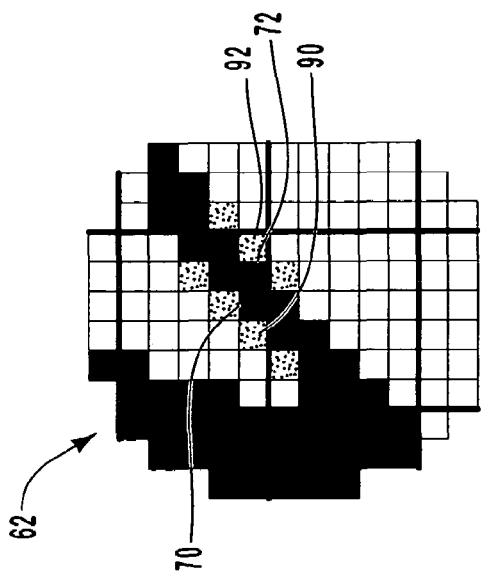
Figure 4A:
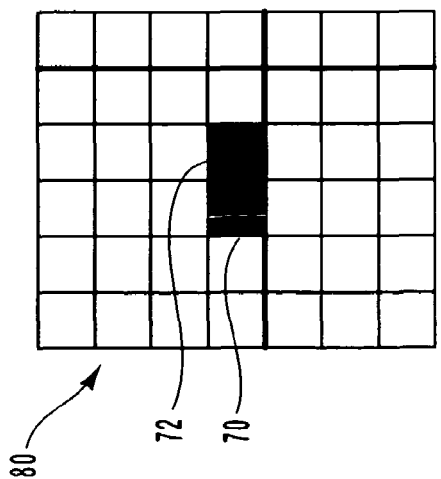

FIG. 4A shows the section of supersample grid 80 corresponding to samples 70 and 72. As explained with reference to FIG. 3, the dropout control operations of the present invention identify a set of samples for a row of samples that fall within the image outline. The samples comprise a group of one or more consecutively placed samples. Samples 70 and 72 comprise a group of consecutively spaced samples that fall within the image outline for the row of samples being processed. Once the set of samples is identified, it is determined whether the set of samples that fall within the image outline comprise a minimum number of samples. Once it is determined whether the set of samples does not comprise the minimum number of samples, the dropout control operations selectively add samples to the set of samples such that the set of samples comprises the minimum number of samples.

FIG. 4B illustrates one manner in which samples can be added to the set of samples that were originally determined to fall within the image outline. In the illustrated embodiment, the minimum number of samples is four samples. Accordingly, two additional samples 90 and 92 are added to set of samples comprised of samples 70 and 72. The differential shading of samples 70, 72 and 90, 92 is utilized for illustrative purposes to show the samples that were placed as part of the original sampling routines and the samples that were added subsequent to the dropout control operations. Where the set of samples comprises four or more samples, the dropout control algorithms proceed without the addition of additional samples to the set of samples. This is due to the fact that the minimum number of samples that fall-within the image outline, in this case four samples, represents the number of samples needed to avoid a dropout condition. For each set of samples that fall within the image outline comprising four or more samples, no dropout condition is identified and no samples must be added to compensate for a dropout condition.

FIG. 4C illustrates the portion of supersample grid 62 corresponding to dropout region of image 50b. There is shown the set of samples comprising samples 70 and 72 and added samples 90 and 92. The differential shading of samples is included for illustrative purposes to show the original samples, and the samples that are added as a result of the dropout control operations of the present invention (see e.g., samples 70, 72 and 90, 92.) The differential shading also illustrates that samples for other columns of pixels are added to sets of samples at or near the top and/or bottom pixel boundaries.

Figure 4D:
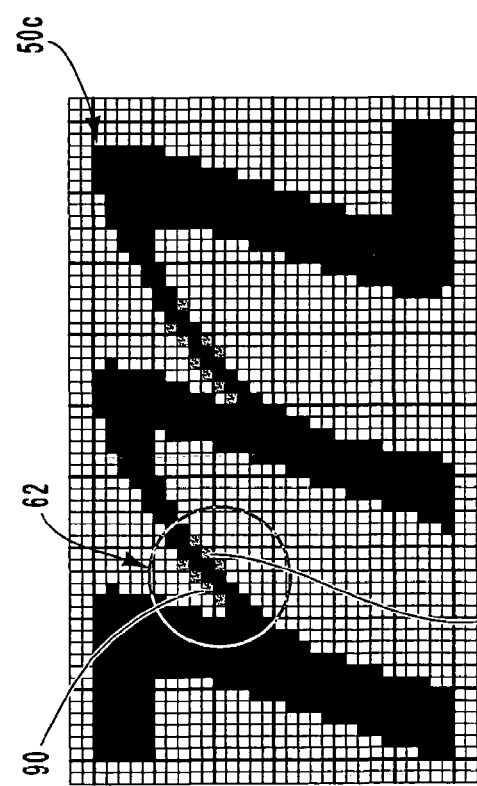

FIG. 4D illustrates dropout control version of image 50c depicted subsequent to the horizontal dropout control operations. There are shown added samples 90 and 92 as well as other samples added by the dropout control routines. FIG. 4D illustrates that the horizontal dropout control routines result in the addition of samples to the more narrow portions of dropout control version of image 50c. The wider portions of dropout control version of image 50c do not result in addition of samples as a result of the sampling routines. This is due to the fact that the more narrow portions of dropout control version of image 50c comprise-portions of the image where a dropout condition has occurred while the wider portions of dropout control version of image 50c comprise portions of the image where no dropout condition has occurred.

Figure 5A:
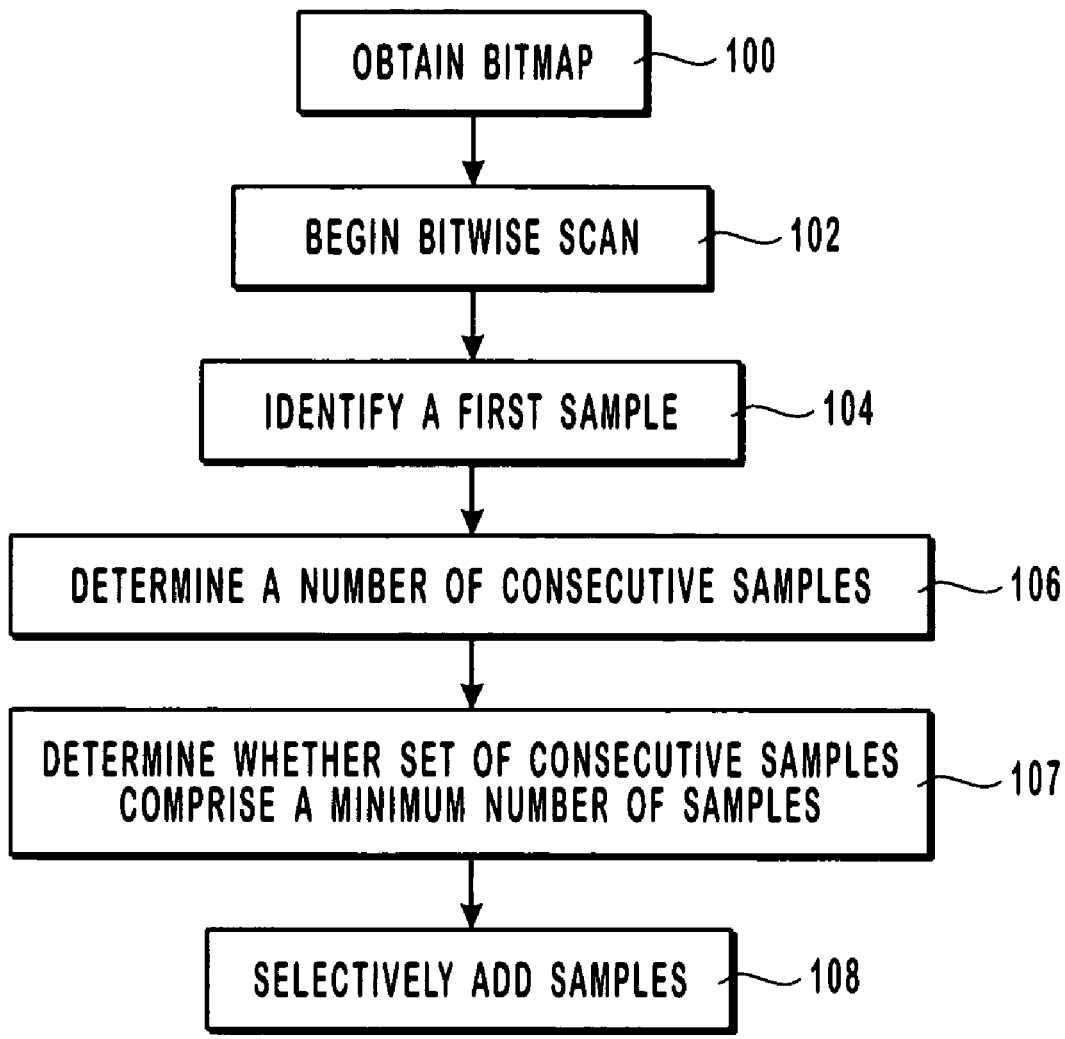
FIGS. 5A and 5B are flow diagrams illustrating methods of dropout control in the horizontal direction according to illustrative embodiments of the present invention.
Figure 5B:
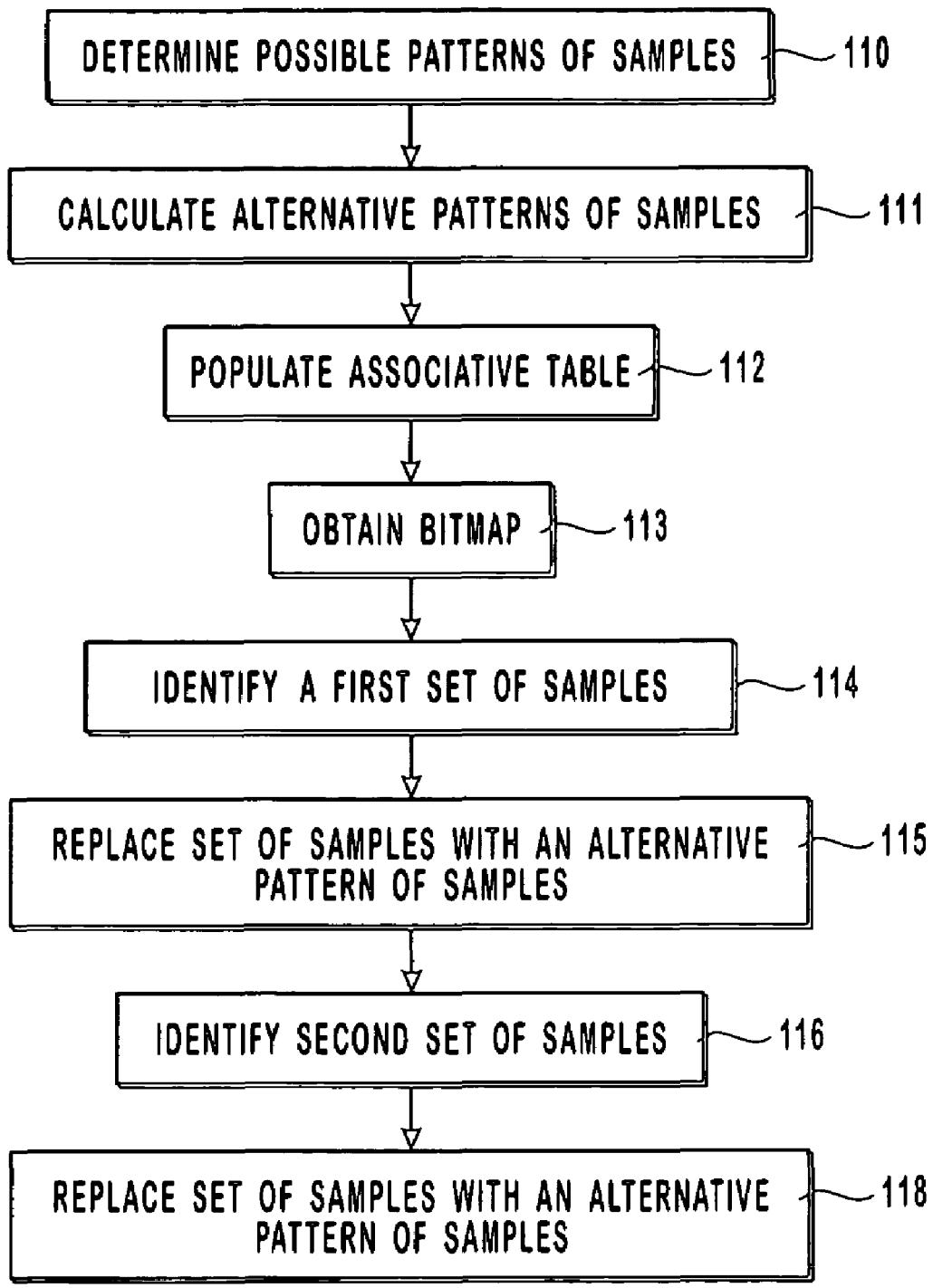

FIGS. 5A and 5B are flow diagrams illustrating alternative methods of dropout control that can be used in the horizontal direction according to illustrative embodiments of the present invention. According to the method of FIG. 5A, the dropout control operations obtain a bitmap having a plurality of samples in step 100. Once the bitmap is obtained, a bitwise scan of the bitmap is started in step 102. A first sample that falls within the image outline is identified by the dropout control operations in step 104. Once a first such sample is identified, the number of adjacent samples that fall within the image outline is determined in step 106. Subsequent to determining the number of adjacent samples, it is determined whether the set of consecutive samples comprise a minimum number of samples in step 107. The dropout control operations then selectively add samples to the set of samples in step 108. The steps of identifying a set of adjacent samples and selectively adding samples to the set are repeated until the entire bitmap has been processed. In one embodiment, the step of selectively adding samples comprises adding samples to the set of samples such that the set of samples that are designated as falling within the image outline comprises the minimum number of samples.

According to the alternative method of FIG. 5B, all of the possible patterns of samples that can comprise a stretch of samples are determined in step 110. Once the possible patterns of samples are determined, alternative patterns of samples are calculated in step 111. The alternative patterns of samples are adapted to ensure that each set of samples comprises the minimum number of samples. An associative table is then populated with the alternative patterns of samples in step 112. Once the associative table is populated, the bitmap is obtained in step 113. The pattern of a first stretch of samples of the bitmap is identified in step 114. Once the pattern of the first stretch of samples is identified, the stretch of samples is replaced with the associated alternative pattern of samples utilizing the associative table in step 115. The pattern of a second stretch of samples of the bitmap is then identified in step 116. Once the pattern of the second stretch of samples is identified, the stretch of samples is replaced with the associated alternative pattern of samples utilizing the associative table in step 118. In the preferred embodiment, the steps of identifying the pattern of a stretch of samples of the bitmap and replacing the stretch of samples with an associated alternative pattern of samples is repeated until the entire bitmap has been processed. As previously mentioned, the alternative patterns of samples of the associative table are adapted to ensure that each set of samples comprises the minimum number of samples. The use of alternative patterns of samples does not always result in a change to the pattern of a stretch of samples. For example, where a stretch of samples comprises 12 samples and a given stretch of samples includes a single set of samples having more than the minimum number of samples, the use of the associative table and alternative patterns of samples results in no change to the stretch of samples because there is no set of samples having less than the minimum number of samples. A stretch of samples, as used in the context of the present description, is one example of a section of the bitmap.

In one embodiment of the present invention, the dropout control operations are adapted to control for "inktraps." Inktraps can be created when pixels are added to closely spaced but disjointed sets of pixels resulting in an unnaturally thick appearance of portions of an object. For example, the arches of the lower case character "m" can result in an inktrap where samples are added to the character stems. The dropout control operations control for inktraps by treating closely spaced but disjointed sets of pixels differently than widely spaced stretches by adding fewer samples to these sets of samples as appropriate. As will be appreciated by those skilled in the art, the type and combinations of routines utilized with horizontal dropout control operations can be of a variety of types and configurations without departing from the scope and spirit of the present invention.

3. Vertical Dropout Control

FIG. 6 illustrates the manner in which samples can be added to existing samples in the direction parallel to the striping of the pixel subcomponents such that weighted anti-aliasing applied in the direction parallel to the striping of the pixel sub-components will take sufficient account of the samples. Weighted anti-aliasing is utilized in the direction parallel to the striping of the pixel sub-components because sub-pixel rendering fails to provide additional resolution in the direction parallel to the striping of the pixel sub-components. Weighted anti-aliasing allows the amount of anti-aliasing applied to a graphics object to be adapted to the size of the object being rendered. A more complete discussion of the use of weighted anti-aliasing in rendering of images of different font sizes is provided in U.S. patent application Ser. No. 10/146,424, entitled "Type Size Dependent Anti-Aliasing in Sub-Pixel Precision Rendering Systems", filed May 14, 2002.

Weighted anti-aliasing gives greater weight to the samples at the pixel centers than the samples at the edges of the pixels. This is particularly true of objects having small font sizes. Accordingly, portions of an object represented by samples at the pixel boundary can result in little or no shading of a pixel sub-component corresponding therewith. This typically results in a dropout condition. Dropout control applied in the direction parallel to the striping of the pixel sub-components is adapted to place samples such that weighted anti-aliasing applied in the direction parallel to the striping of the pixel sub-components will take sufficient account of the samples. Dropout control applied in the direction parallel to the striping of the pixel sub-components will be discussed with reference to the vertical direction for illustrative purposes. As will be appreciated by those skilled in the art, the direction parallel to the striping of the pixel sub-components is not limited to the vertical direction, but will be discussed with reference to the vertical direction for the sake of clarity.

Figure 6B:
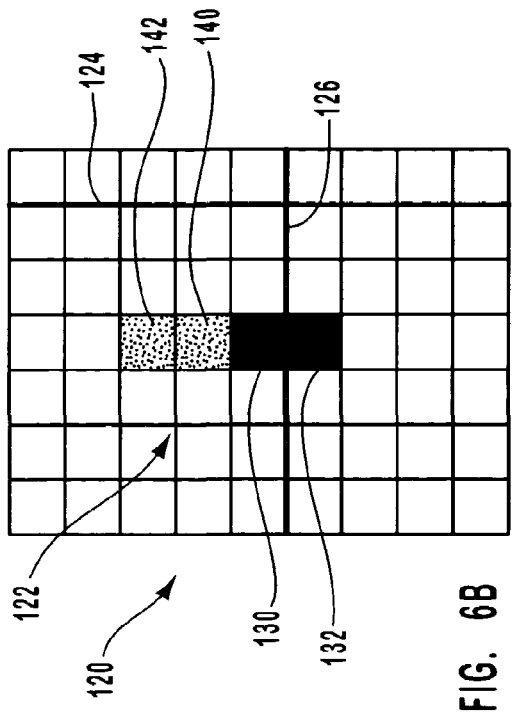
FIGS. 6A through 6D illustrate the manner in which samples can be added to existing samples in the vertical direction such that weighted anti-aliasing applied in the vertical direction will take sufficient account of the samples.
Figure 6C:
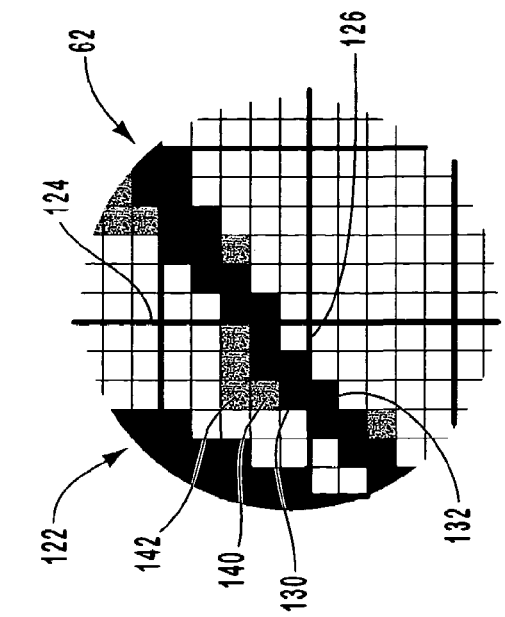
Figure 6A:
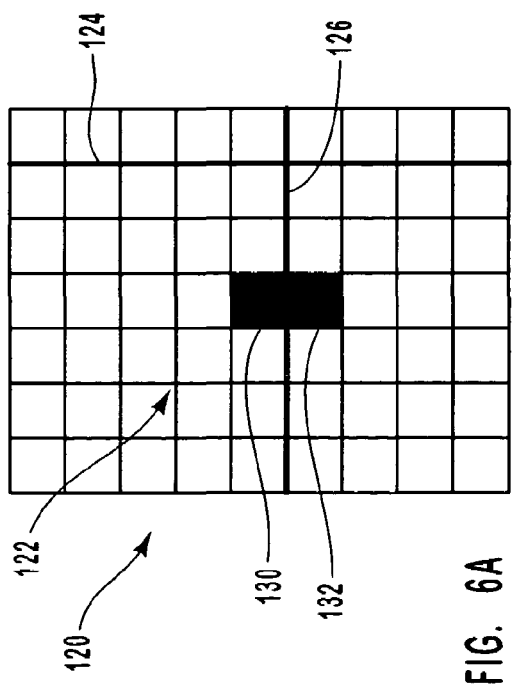

With reference to FIG. 6A, there is shown a section of supersample grid 120 corresponding to pixel 122. The emboldened lines of supersamples grid 120 represent right pixel boundary 124 and bottom pixel boundary 126. There is shown a first sample 130 and a second sample 132 corresponding to supersample grid 120. First and second samples 130 and 132 comprise a set of samples that fall within the image outline and are positioned in a particular column of samples. The set of samples comprises all of a group of vertically adjacent samples in the column of the section of supersample grid 120. Dropout control applied in the vertical direction processes the bitmap column by column. In processing the bitmap column by column, sets of samples are identified for each column of samples. The number and placement of first and second samples 130 and 132 is likely to result in a dropout condition. Because the set of samples comprises only two samples positioned at either side of the bottom pixel boundary 126, vertical anti-aliasing will result in little or no shading of the pixel sub-components corresponding to first and second samples 130 and 132.

FIG. 6B illustrates the manner in which samples are added to the set of samples to reduce the dropout condition. Once the set of samples is identified, dropout control operations calculate whether the set of samples that fall within the image outline comprise the minimum number of samples. It is additionally determined whether the samples of the set of samples that fall within the image outline are placed, with respect to pixel boundaries, such that the weighted anti-aliasing will take sufficient account of the samples. Samples are selectively added to the set of samples that fall within the image outline such that the samples comprise the minimum number of samples. The samples are positioned, with respect to one or more pixel sub-components, such that the weighted anti-aliasing will take sufficient account of the samples. Because the weighted anti-aliasing gives greater weight to samples at the pixel centers than samples at pixel boundaries, added samples 140 and 142 are added to samples 130 and 132 of the vertically adjacent set of samples in the direction of the center of pixel 122.

With reference now to FIG. 6C, there is shown a portion of supersample grid 62 corresponding to a dropout region of image 50b. There are shown samples 130 and 132 as well as added samples 140 and 142. The differential shading of samples is included for illustrative purposes to show the original samples, and the samples that are added as a result of the dropout control operations of the present invention (see e.g., samples 130, 132 and 140, 142). The differential shading also illustrates that added samples for other columns of pixels are added to sets of samples at or near the top and/or bottom pixel boundaries.

Figure 6D:
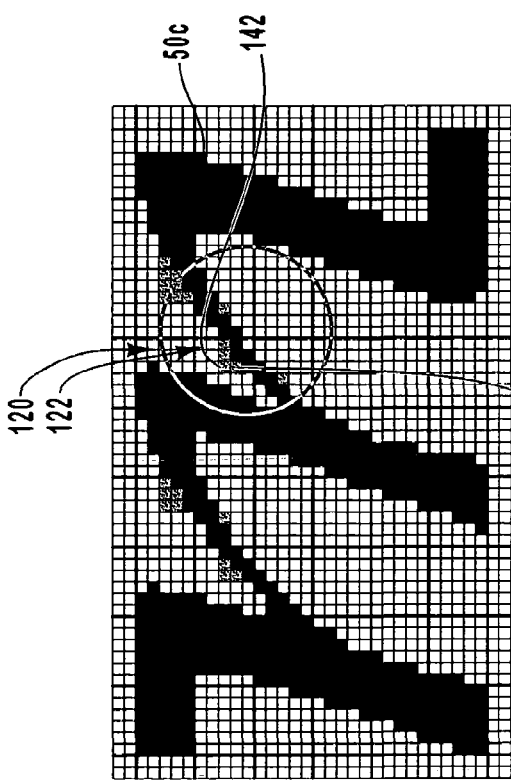

FIG. 6D illustrates dropout control version of image 50c depicted subsequent to the vertical dropout control operations. There is shown added samples 140 and 142 as well as other samples added by the dropout control routines. FIG. 6D illustrates that the vertical sampling results in the addition of samples to the more narrow object stems of dropout control version of image 50c. In contrast, object stems of dropout control version of image 50c represented by the minimum number of samples do not result in addition of samples as a result of the sampling routines. This is due to the fact that the narrow object stems of the image comprise portions of the image having dropout conditions while the thicker object stems comprise portions of the image not having dropout conditions. It will be understood that vertical dropout control can be utilized with thicker object stems where the vertical dropout control is adapted to position samples such that vertical anti-aliasing will take sufficient account of the samples.

Figure 7A:
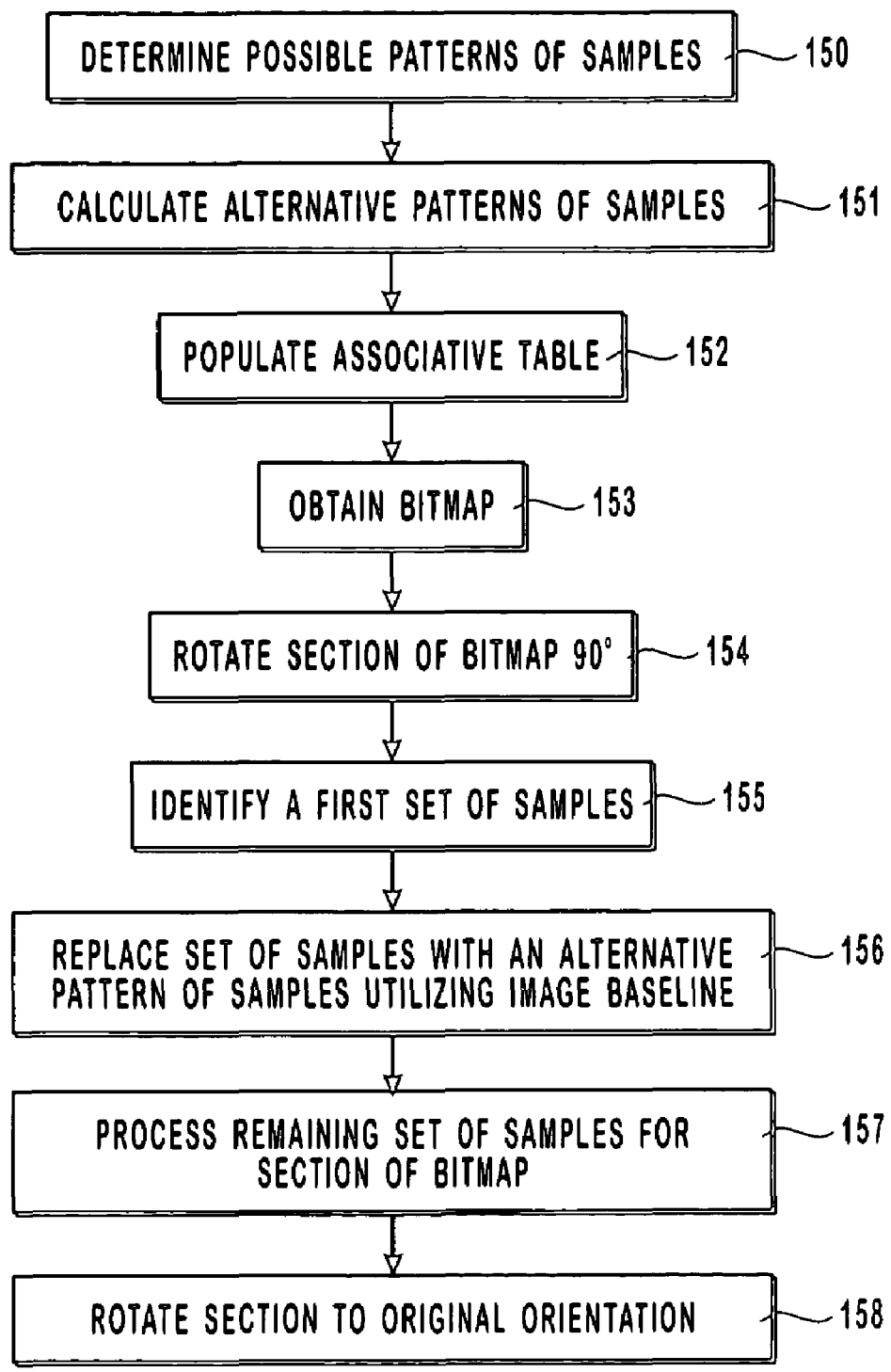
FIGS. 7A and 7B are flow diagrams illustrating methods of dropout control in the vertical direction according to illustrative embodiments of the present invention.
Figure 7B:
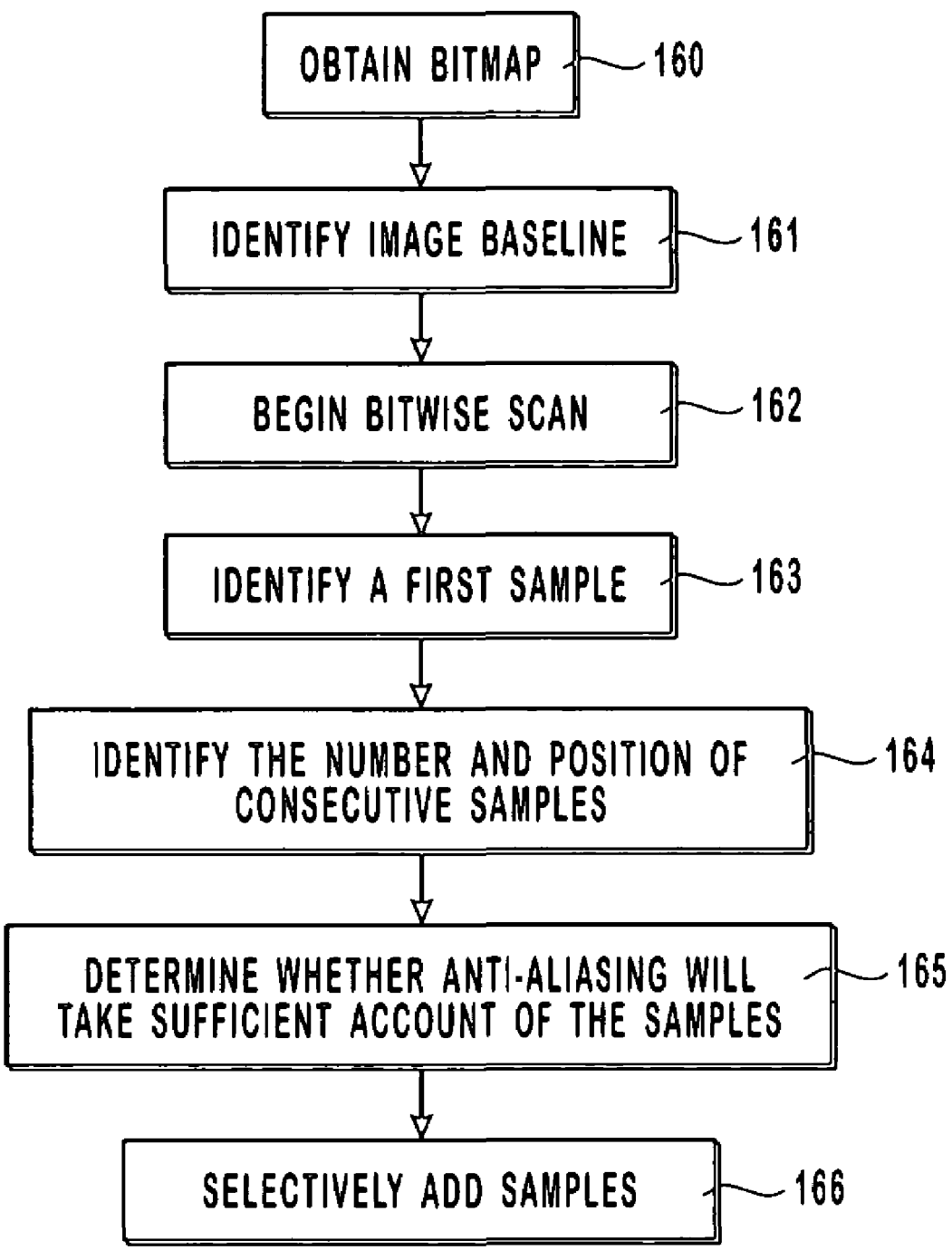

FIGS. 7A and 7B are flow diagrams illustrating alternative methods of vertical dropout control according to illustrative embodiments of the present invention. In the method of FIG. 7A, all of the possible patterns of samples that can comprise a stretch of samples are determined in step 150. Alternative patterns of samples for each of the possible patterns are calculated in step 151. An associative table is populated with the alternative patterns of samples in step 152. The bitmap is then obtained in step 153. A section of the bitmap is rotated 90 degrees such that the vertical direction becomes the horizontal direction in step 154. Once the section of the bitmap is rotated, the pattern of samples is identified for a first stretch of samples. Utilizing the image baseline, the pattern of samples for the first stretch of samples is replaced with the alternative patterns of samples utilizing the associative table in step 156. The image baseline is utilized to reduce possible artifacts by assuring that samples are added in a uniform fashion to the original sets of samples. Once the stretch of samples is replaced with an alternative pattern of samples, the remaining stretches of samples of the section of bitmap are processed in step 156. Once the stretches of samples of the section of bitmap have been processed, the section of the bitmap is rotated to its original orientation in step 158. Sections of the bitmap are rotated, processed, and returned to their original orientation until the entire bitmap has been processed. In one embodiment of the present invention, the dropout control operations are used to calculate alternative patterns of samples that are placed in an associative table utilized in processing sections of the bitmap. In one embodiment, the associative table is the same associative table created by the horizontal dropout control operations. The rotation of the section of bitmap is performed to facilitate the processing of the bitmap. The rotation of the bitmap converts vertically adjacent bits into horizontally adjacent bits. Because many graphic rendering systems perform bit-wise comparisons of the bitmap in the horizontal direction, rotation of the section of bitmap facilitates the processing of the vertically adjacent samples in the columns of the bitmap by temporarily converting them to horizontally adjacent samples.

In the method of FIG. 7B, the bitmap of the image is obtained in step 160. The baseline of the image is identified in step 161. Once the baseline is identified, a bit-wise scan is begun in step 162. A first sample is identified in step 163. Once the first sample is identified, the number and position of consecutive samples are identified in step 164. It is then determined whether anti-aliasing will take sufficient account of the samples in step 165. Where it is determined that the number and position of the consecutive number of samples is such that anti-aliasing will not take sufficient account of the samples, samples are added in step 166 such that anti-aliasing will take sufficient account of the samples. The bit-wise scan continues to identify consecutive samples and selectively add samples until the entire bitmap has been processed.

In one embodiment of the present invention, the dropout control operations perform a bit-wise operation to add samples where a condition on a combination of samples is encountered. In one embodiment, the weighting applied to the samples utilized in the anti-aliasing routines is dependent on the font size of the image being rendered. Accordingly, the font size of the image is utilized in the vertical dropout control operations.

In one embodiment, adding samples to the set of samples that are designated as falling within the image outline comprises adding samples to the set of samples such that the set of samples comprises the minimum number of samples. In another embodiment, the adding samples to the set of samples also comprise positioning the samples of each of the set of samples such that the weighted anti-aliasing will take sufficient account of the samples. In yet another embodiment, the second set of dropout control operations determines the pixels to which samples will be added when the set of samples is at or near the top or bottom pixel boundary. In yet another embodiment, determining whether the set of samples that fall within the image outline comprises determining whether the samples of the set of samples that fall within the image outline are optimally positioned with respect to one or more pixel sub-components such that the weighted anti-aliasing will take sufficient account of the samples.

The baseline is utilized in the vertical dropout control operations to reduce artifacts that can be created by asymmetrical addition of samples. An artifact can be created by the addition of samples in the vertical direction because the grid fitted outlines often utilized in intelligent dropout control are not easily accessible by the vertical dropout control routines. Because the grid fitted outlines are not easily accessible, it becomes difficult to determine where to add samples when the set of samples is positioned at a pixel boundary. In the absence of the grid fitted outlines, the vertical dropout control operations utilize the baseline to symmetrically add samples to sets of samples located at pixel boundaries for portions of the object above and below the image baseline. For example, where it is determined that samples will be added to the pixel above the pixel boundary for portions of the image above the baseline, samples will be added to pixels below the pixel boundary for portions of the image below the baseline. This increases the symmetry of the image because samples are uniformly added to the pixels located furthest from the baseline. As will be appreciated by those skilled in the art, symmetry can also be achieved by uniformly adding samples to the pixels located closest to the baseline. By adding samples by proceeding from the baseline, possible artifacts that result from the addition of samples are minimized.

For example, the small case letter "i" is positioned entirely above the baseline. In contrast the letter "g" has portions of the object above and below the baseline. The upper portion of the character lies above the baseline, while the lower portion of the character descends below the baseline. By utilizing the baseline when rendering an object, image symmetry is improved by adding samples to portions of the image positioned above and below the baseline in a uniform fashion. The routines and methods of vertical dropout control can include a variety of steps in a variety of configurations without departing from the scope or spirit of the present invention.

Figure 8B:
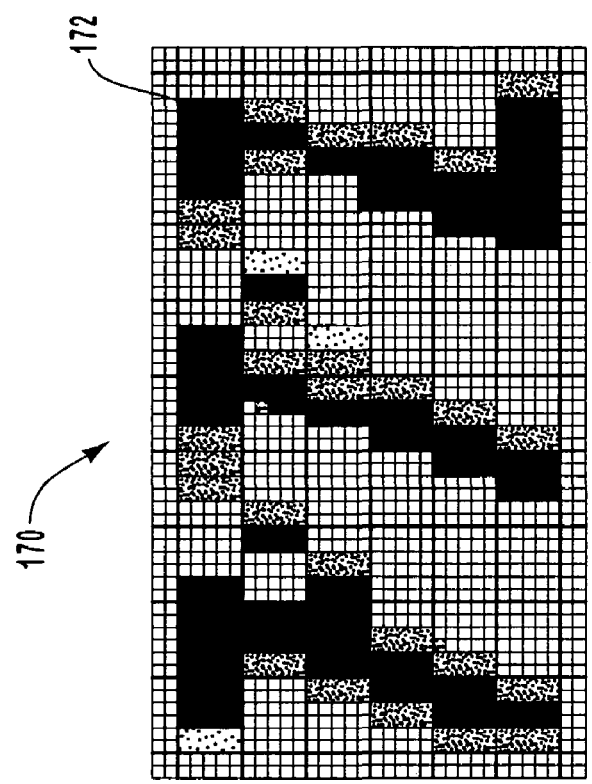
FIGS. 8A and 8B illustrate the manner in which samples added utilizing dropout control routines applied in the horizontal and vertical direction result in an improved image quality.
Figure 8A:
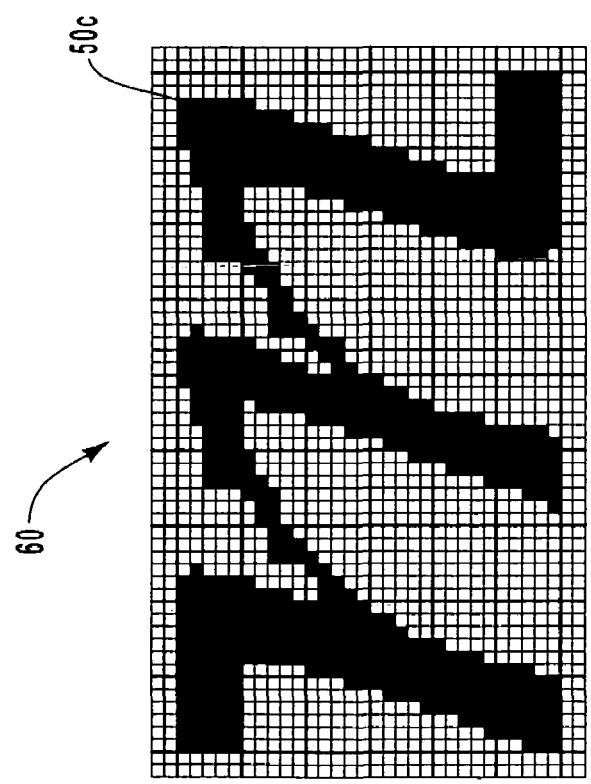

FIG. 8 illustrates the manner in which the samples added utilizing dropout control routines applied in the horizontal and vertical direction result in an improved quality of the rendered image. In FIG. 8A there is shown dropout control version of image 50c on supersample grid 60. In the illustrated embodiment, dropout control version of image 50c is rendered using horizontal and vertical dropout control routines. Accordingly, the samples comprising dropout control version of image 50c comprise samples added to sets of horizontally adjacent samples and samples added to sets of vertically adjacent samples. FIG. 8B illustrates a portion of a display 170 depicting a dropout control rendered image 172. Dropout control rendered image 172 is comprised of pixel sub-components of portion of display 170. The vertical and horizontal dropout control routines used to render image 172 position the samples of FIG. 8A such that the anti-aliasing applied to the rendered image does not result in thin and/or faint object stems of the dropout control rendered image 172.

As will be appreciated by those skilled in the art, the particular method of dropout control is not limited to the types and configurations discussed in FIGS. 1–8. A variety of types and configurations of dropout control can be utilized by those skilled in the art. For example, in one embodiment, the horizontal and/or vertical dropout control can be performed by hardware associated with a graphics processor utilized on a sophisticated graphics processor.

4. Illustrative Computing Environment

The embodiments of the present invention may comprise a special purpose or general-purpose computer including various computer hardware as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 9:
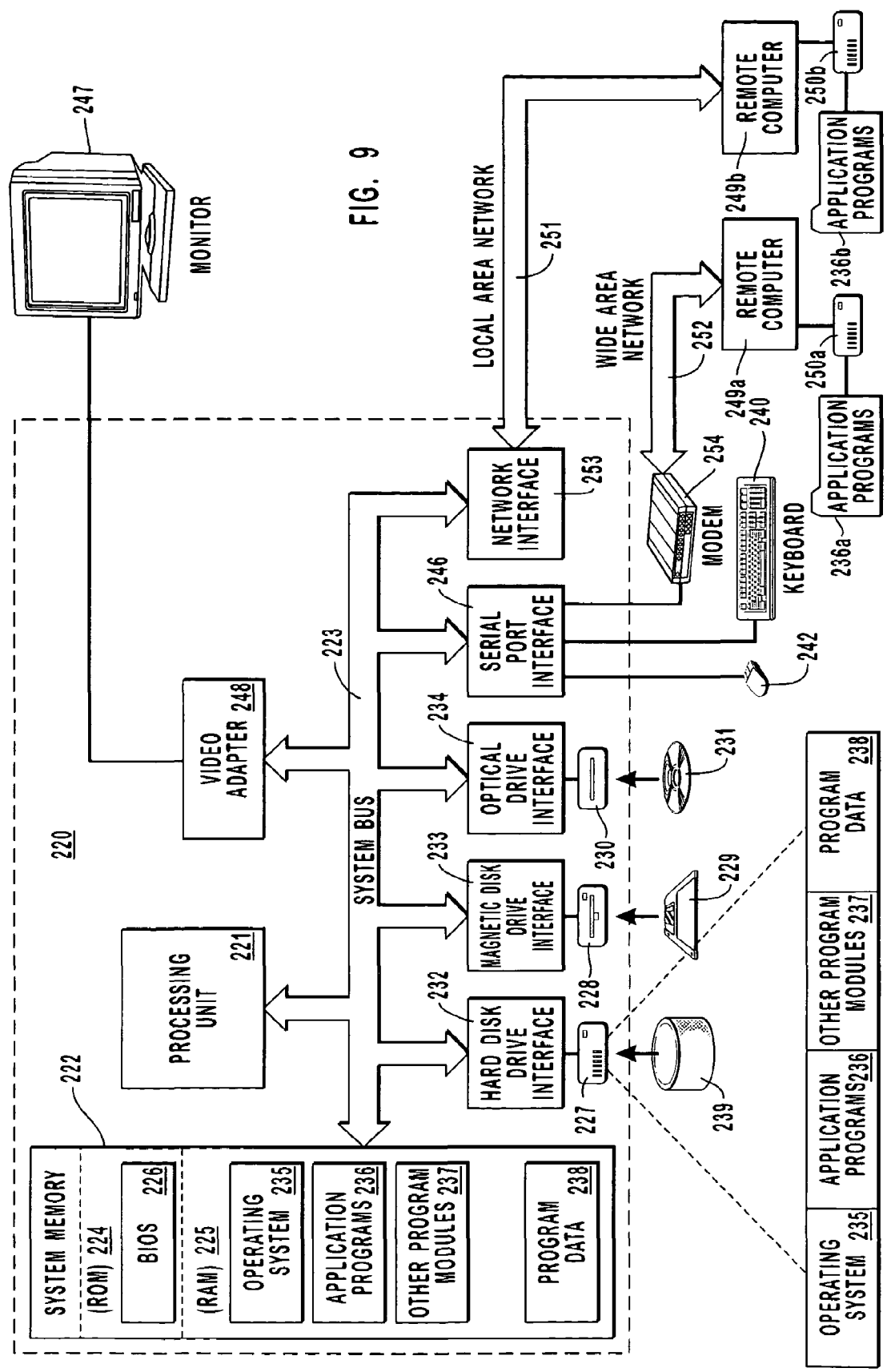
FIG. 9 is a schematic diagram depicting an illustrative operating environment in which the present invention can be utilized.

FIG. 9 and the following discussion are intended to provide a brief, general description of a suitable computing environment in which the invention may be implemented. Although not required, the invention is described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed above. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an exemplary system for implementing the invention includes a general purpose computing device in the form of a conventional computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 24.

The computer 220 may also include a magnetic hard disk drive 227 for reading from and writing to a magnetic hard disk 239, a magnetic disk drive 228 for reading from or writing to a removable magnetic disk 229, and an optical disk drive 230 for reading from or writing to removable optical disk 231 such as a CD-ROM or other optical media. The magnetic hard disk drive 227, magnetic disk drive 228, and optical disk drive 230 are connected to the system bus 223 by a hard disk drive interface 232, a magnetic disk drive-interface 233, and an optical drive interface 234, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 239, magnetic disk 229, optical disk 231, ROM 224 or RAM 225, including an operating system 235, one or more application programs 236, other program modules 237, and program data 238. A user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 46 coupled to system bus 223. Alternatively, the input devices may be connected by other interfaces, such as a parallel port, a game port or a universal serial bus (USB). A monitor 247 or another display device is also connected to system bus 223 via an interface, such as video adapter 248. In addition to the monitor, personal computers typically include other peripheral output devices (not shown), such as speakers and printers.

The computer 220 may operate in a networked environment using logical connections to one or more remote computers, such as remote computers 249a and 249b. Remote computers 249a and 249b may each be another personal computer, a server, a router, a network PC, a peer device or other common network node, and typically include many or all of the elements described above relative to the computer 220, although only memory storage devices 50a and 50b and their associated application programs 236a and 236b have been illustrated in FIG. 9. The logical connections depicted in FIG. 9 include a local area network (LAN) 251 and a wide area network (WAN) 252 that are presented here by way of example and not limitation. Such networking environments are commonplace in office-wide or enterprise-wide computer networks, intranets and the Internet.

When used in a LAN networking environment, the computer 220 is connected to the local network 251 through a network interface or adapter 253. When used in a WAN networking environment, the computer 220 may include a modem 254, a wireless link, or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing communications over wide area network 252 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for use in a processing device associated with a display device that has a plurality of pixels, each pixel having red, green and blue sub-pixel components each of which is separately controllable, and wherein the red, green and blue sub-pixel components are arranged to form either vertical or horizontal stripes, the computer program product comprising one or more computer-readable media having computer-executable instructions for implementing a method of using both horizontal and vertical dropout control adapted to compensate for thin image features when rendering the image, the method comprising:

an act of receiving a bitmap having a plurality of samples representing an image;

for the direction that is perpendicular to the striping formed by the sub-pixel components, an act of identifying a first set of samples within the bitmap that comprise a group of one or more adjacent samples that fall within an outline of the image;

an act of determining whether the first set of samples comprises a minimum number of samples; and an act of selectively adding samples to the first set of samples such that the first set of samples comprises the minimum number of samples; and for the direction that is parallel to the striping formed by the sub-pixel components, an act of identifying a second set of samples within the bitmap that comprise a mutually exclusive group of one or more adjacent samples that fall within an outline of the image;

act of calculating whether the second set of samples comprises a minimum number of samples that fall within the outline of the image; and a step for determining whether the samples of the second set of samples are positioned with respect to boundaries of a pixel such that a weighted anti-aliasing filtering will take sufficient account of the second set of samples.

2. The computer program product of claim 1, wherein the first set of samples comprises a mutually exclusive set of consecutive samples.

3. The computer program product of claim 1, wherein the direction that is perpendicular to the striping formed by the sub-pixel components horizontal, and wherein the samples of the first set of samples comprise all of a group of consecutive samples for a row of samples.

4. The computer program product of claim 1, wherein the minimum number of samples for the first set of samples comprises the number of samples needed to compensate for thin image features.

5. The computer program product of claim 1, wherein identifying a set of samples for a row of samples is conducted by processing discrete sections of the bitmap.

6. The computer program product of claim 5, wherein the discrete sections of the bitmap are processed in a bitwise fashion.

7. The computer program product of claim 5, wherein the discrete sections of the bitmap are processed utilizing an associative table.

8. The computer program product of claim 7, wherein selectively adding samples comprises replacing the set of samples with an alternative pattern of samples from the associative table.

9. A computer program product for use in a processing device associated with a display device that has a plurality of pixels, each pixel having a plurality of separately controllable pixel sub-components, wherein vertical anti-aliasing is applied to an image rendered with pixel sub-component precision, the computer program product comprising one or more computer-readable media having computer-executable instructions for implementing a method of drop-out control adapted to compensate for thin image features when rendering the image, the method comprising:

an act of receiving a bitmap having a plurality of samples representing an image;

an act of identifying a set of samples for a column of samples, wherein the set of samples comprise a mutually exclusive group of one or more adjacent samples that fall within an outline of the image;

and act of calculating whether the set of samples comprises a minimum number of samples that fall within the outline of the image; and a step for determining whether the samples of the set of samples are positioned with respect to boundaries of a pixel such that a weighted anti-aliasing filtering will take sufficient account of the samples.

10. The computer program product of claim 9, wherein the method further comprises selectively adding samples to the set of samples such that the set of samples comprises the minimum number of samples positioned with respect to the boundaries of the pixel such that the weighted anti-aliasing will take sufficient account of the samples.

11. The computer program product of claim 9, wherein the steps of identifying a set of samples for a column of samples and calculating whether the set of samples comprise a minimum number of samples, are conducted by processing sections of the bitmap.

12. The computer program product of claim 11, wherein an associative table is utilized to process sections of the bitmap.

13. The computer program product of claim 12, wherein a set of samples is replaced with an alternative pattern of samples utilizing the associative table.

14. The computer program product of claim 13, wherein an image baseline is utilized to process sections of the bitmap.

15. The computer program product of claim 12, wherein processing sections of the bitmap comprises obtaining a section of the bitmap and rotating the orientation of the section 90 degrees such that vertically adjacent samples become horizontally adjacent.

16. The computer program product of claim 15, wherein processing sections of the bitmap further comprises rotating the section of the bitmap to its original orientation once the samples are added to the set of samples.

17. The computer program product of claim 11, wherein processing sections of the bitmap is conducted by performing a bit-wise comparison of the samples of the section of the bitmap to determine whether the set of samples comprise a minimum number of samples.

18. The computer program product of claim 17, wherein the step of selectively adding samples comprises adding samples to the set of samples such that the set of samples comprises the minimum number of samples.

* * * * *